US008783108B2

(12) United States Patent
Classen

(10) Patent No.: US 8,783,108 B2
(45) Date of Patent: Jul. 22, 2014

(54) MICROMECHANICAL SYSTEM FOR DETECTING AN ACCELERATION

(75) Inventor: Johannes Classen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 12/876,559

(22) Filed: Sep. 7, 2010

(65) Prior Publication Data

US 2011/0056297 A1 Mar. 10, 2011

(30) Foreign Application Priority Data

Sep. 8, 2009 (DE) .......................... 10 2009 029 248

(51) Int. Cl.
*G01P 15/125* (2006.01)
(52) U.S. Cl.
CPC ..................................... *G01P 15/125* (2013.01)
USPC ......................................................... 73/514.32
(58) Field of Classification Search
USPC ............... 73/514.32, 514.36, 514.38, 514.24, 73/514.18
See application file for complete search history.

(56) References Cited

U.S. PATENT DOCUMENTS

| 6,230,566 | B1 * | 5/2001 | Lee et al. ................... | 73/514.32 |
| 6,935,175 | B2 * | 8/2005 | Eskridge et al. ........... | 73/514.32 |
| 7,121,141 | B2 * | 10/2006 | McNeil ...................... | 73/514.32 |
| 7,146,856 | B2 * | 12/2006 | Malametz ................... | 73/514.32 |
| 7,578,190 | B2 * | 8/2009 | Lin et al. .................... | 73/514.29 |
| 8,079,262 | B2 * | 12/2011 | Guo ........................... | 73/514.32 |
| 2006/0185433 | A1 * | 8/2006 | Leonardson et al. ...... | 73/514.32 |
| 2007/0000323 | A1 * | 1/2007 | Kuisma ....................... | 73/514.32 |
| 2008/0134785 | A1 * | 6/2008 | Pruetz ........................ | 73/514.32 |
| 2008/0173091 | A1 * | 7/2008 | McNeil et al. ............. | 73/514.32 |
| 2009/0308159 | A1 * | 12/2009 | Frey et al. .................. | 73/514.32 |

FOREIGN PATENT DOCUMENTS

| EP | 0 244 581 | 11/1987 |
| EP | 0 773 443 | 5/1997 |

* cited by examiner

*Primary Examiner* — Helen Kwok
(74) *Attorney, Agent, or Firm* — Kenyon & Kenyon LLP

(57) ABSTRACT

A micromechanical system for detecting an acceleration includes a substrate, a rocker-like mass structure having a first lever arm and a diametrically opposed second lever arm, the lever arms being situated tiltably at a distance to the substrate and about an axis of rotation to the substrate, and first and second electrodes being provided on the substrate. Each electrode is diametrically opposed to a lever arm and each lever arm includes a section extending from the axis of rotation which is located between the electrodes above an intermediate space. The two sections have different masses.

9 Claims, 2 Drawing Sheets

MICROMECHANICAL SYSTEM FOR DETECTING AN ACCELERATION

BACKGROUND INFORMATION

Acceleration sensors can be structured as micromechanical systems. Such sensors are used, for example, in motor vehicles where passenger protection devices (airbag, belt tightener, etc.) or driver assist systems (brake assist for stopping on a slope) evaluate an acceleration signal. One design of such micromechanical acceleration sensors determines an acceleration acting perpendicularly to a substrate with the aid of a rocker-like mass structure. The mass structure is situated tiltably in relation to the substrate about an axis of rotation running parallel to the substrate. A torsion spring holds the mass structure parallel to the substrate in its resting position. Two lever arms of the mass structure which are diametrically opposed with respect to the axis of rotation have varying lengths, so that a center of gravity of the mass structure is outside of the axis of rotation. If an acceleration acts on the rocker-like mass structure perpendicular to the substrate, the center of gravity is deflected against the force of the torsion springs, so that one lever arm tilts toward the substrate and the other tilts away from the substrate.

Normally, electrodes are provided on the substrate under the mass structure, the electrodes together with the mass structure being connected to capacitors. If a distance between one electrode and the mass structure changes, the capacitance of the capacitor also changes. The capacitance is determined and an acceleration signal is provided based on it.

Such micromechanical systems are described in European Patent Application No. EP 0244581 or European Patent No. EP 0773443.

By design, a maximum acceleration that may be recorded using such a micromechanical system is limited to a value that does not yet deflect the mass structure to such an extent that one of the lever arms contacts an electrode or the substrate. The micromechanical system is not able to quantify accelerations exceeding this value, so that they are "cut off" in the resulting acceleration signal. The smallest acceleration at which this effect occurs is called the clipping acceleration.

An object of the present invention is to provide an improved micromechanical system.

SUMMARY OF THE INVENTION

The present invention provides a micromechanical system having a rocker-like mass structure for detecting an acceleration in such a way that capacitors used to determine a deflection of the rocker-like mass structure are provided on the ends of the lever arms of the mass structure and sections of both lever arms have varying masses between the capacitors and the axis of rotation. In this manner, both lever arms may be of equal length, so that a clipping acceleration in both directions has an equal value and offset errors that occur in conventional micromechanical systems due to an asymmetrical design of the mass element are reduced.

Compared to a conventional micromechanical rocker structure, the capacitors for detecting an acceleration a are at a greater distance from the axis of rotation. As a result, the maximum possible change in the spacing of the electrodes of the capacitors and accordingly the relative capacitance change $\Delta C/C$ of each capacitor until clipping occurs is greater than in a conventional rocker structure. In designing the micromechanical system for identical sensitivity $\Delta C/CA$, the clipping acceleration is therefore advantageously increased, typically by a factor of 2.

The different masses of the two sections may be produced by providing a lightening on one side in the form of a recess or deepening, by providing additional weight on one side in the form of additional mass, or by using a combination of both possibilities. The production of the mass difference may thus be coordinated with boundary conditions, such as production requirements.

In an area between the substrate and the mass structure, an additional electrode may be provided on the substrate for shielding a structure lying under it from electrostatic influences due to the mass structure. To this end, the additional electrode may have the electrical potential of the mass structure. Nonetheless, parasitic surface charges on the additional electrode or the mass structure may be trapped, resulting in the action of electrostatic attraction forces between the additional electrode and the mass structure which may cause the mass structure to tilt, causing an offset error. By placing the additional electrode in the area of the axis of rotation instead of on the outer end of a lever arm, the tilting of the mass structure caused by such forces is reduced by a factor of 2.

On its side facing the substrate, the mass structure may carry a cover layer which provides surfaces of equal size with regard to the additional electrode on both sides of the axis of rotation. The cover layer may be used to distribute the mentioned electrostatic forces caused by parasitic surface charges to both lever arms in such a way that the electrostatic forces are mutually compensated and no deflection of the mass structure to one side occurs.

In contrast to known micromechanical systems of this type, the system may include three instead of two functional layers, the first functional layer including the electrodes, the second functional layer being the cover layer and the third functional layer being the mass structure. Only slight additional expense is required for manufacturing the system.

DETAILED DESCRIPTION

Figure 1:
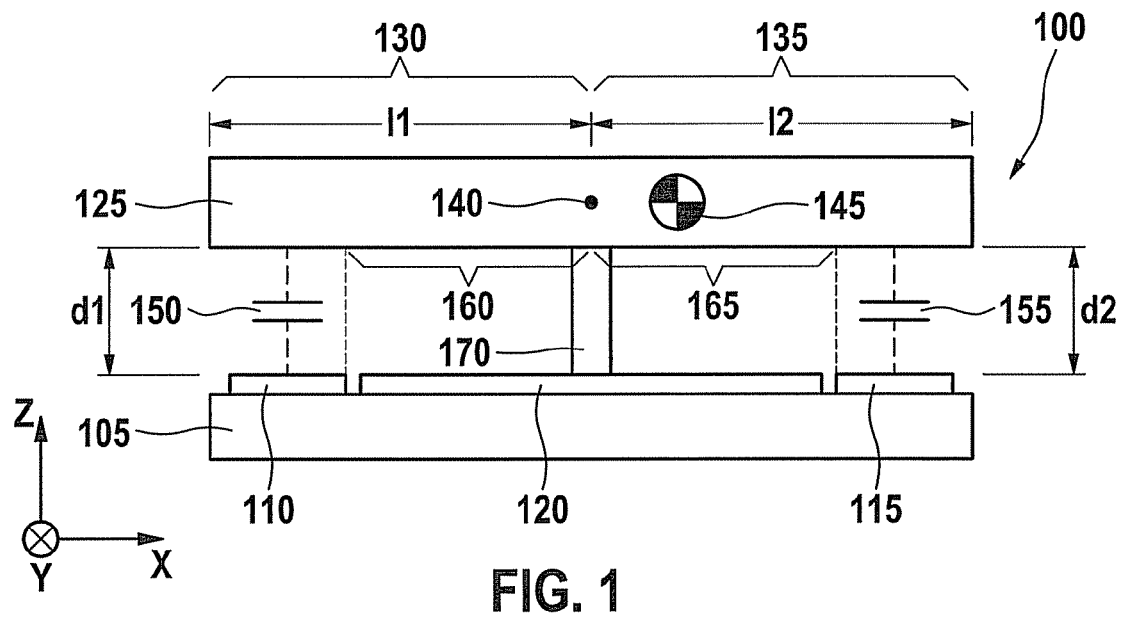
FIG. 1 shows a micromechanical system.

FIG. 1 shows a micromechanical system 100 in the form of an acceleration sensor for detecting an acceleration. A coordinate system specifies x, y and z directions. A first electrode 110, a second electrode 115 and a third electrode 120 are situated adjacent to one another on a substrate 105. A mass structure 125, which is oriented parallel to the surface of substrate 105 in an undeflected state, includes a first lever arm 130 and a second lever arm 135. Mass structure 125 is situated tiltably about an axis of rotation 140 in relation to substrate 105, so that first electrode 110 is located under an end section of first lever arm 130, second electrode 115 is located under an end section of second lever arm 135 and third electrode 120 is located in the area of a fastening structure 170 between first electrode 110 and second electrode 115. A torsion spring (not shown) acts counter to a tilting of mass structure 125 to substrate 105.

A center of gravity 145 of mass structure 125 is outside of axis of rotation 140 on second lever arm 135. First lever arm 130 has a length of l1 as seen from axis of rotation 140, and in the resting position of mass structure 125, is located at a distance d1 above first electrode 110. Second lever arm 135 has a length of l2 and is located at a distance d2 above second electrode 115. A center of gravity 145 of mass structure 125 is outside of axis of rotation 140 on second lever arm 135.

Mass structure 125 forms a first capacitor 150 with first electrode 110 and a second capacitor 155 with second electrode 115. First lever arm 130 includes a first section 160 extending from axis of rotation 140 to an area of the first lever arm which is diametrically opposed to first electrode 110. A second section 165 corresponding to the first section is located in mirror symmetry to axis of rotation 140 on second lever arm 135. With regard to axis of rotation 140, sections 160 and 165 have identical lateral dimensions and extend from axis of rotation 140 to areas of lever arms 130 and 135 which are diametrically opposed to first electrode 110 or second electrode 115. Capacitors 150 and 155 are thus provided at equal distances from axis of rotation 140. Using fastening structure 170, mass structure 125 is fastened to substrate 105 or to third electrode 120. Fastening structure 170 may be designed to be firmly bonded to substrate 105.

If micromechanical system 100 is accelerated upwards (in a positive z direction), mass structure 125 is tilted clockwise about axis of rotation 140 in that distance d2 is reduced and distance d1 is enlarged. With regard to axis of rotation 140, capacitors 150 and 155 have corresponding geometric extensions; therefore, a capacitance of second capacitor 155 is increased by an amount that a capacitance of first capacitor 150 is simultaneously reduced. Capacitors 150 and 155 may thus be connected in the manner of a differential capacitor and the amount $\Delta C$ may be determined using the $\Delta C/C$ method.

If micromechanical system 100 is accelerated downwards (in a negative z direction), mass structure 125 is tilted counterclockwise about axis of rotation 140 in a corresponding manner. Due to the symmetrical design of micromechanical system 100, in particular corresponding lengths l1 and l2 of lever arms 130 and 135, a maximum determinable acceleration (clipping acceleration) is of an identical amount in the positive and negative z direction. This prevents the acceleration signal determined based on the changed capacitances of capacitors 150 and 155 with regard to the sign of the acceleration from being asymmetrical.

An external circuitry for determining the capacitance changes of capacitors 150 and 155 is not shown. Such a circuit may include, for example, an application-specific integrated circuit (ASIC) which is also situated on substrate 105.

Compared to a conventional micromechanical system, in micromechanical system 100, capacitors 150 and 155 are outside of sections 160 and 165, causing the center of gravity asymmetry. The distance between center of gravity 145 and axis of rotation 145 is therefore less than in a conventional micromechanical system, so that a deflection of mass structure 125 at a given acceleration is less than in a conventional micromechanical system. This does in fact also make the tilt angle of mass structure 125 smaller; however, the precision of determining the acceleration using system 100 is nearly as good or entirely as good because the deflection of mass structure 125 in the area of capacitors 150 and 155 is greater than in the conventional rocker structure due to the longer effective lever arms, and thus a change in distances d1 and d2 is greater, also making a change of capacitance of capacitors 150 and 155 greater.

Figure 2:
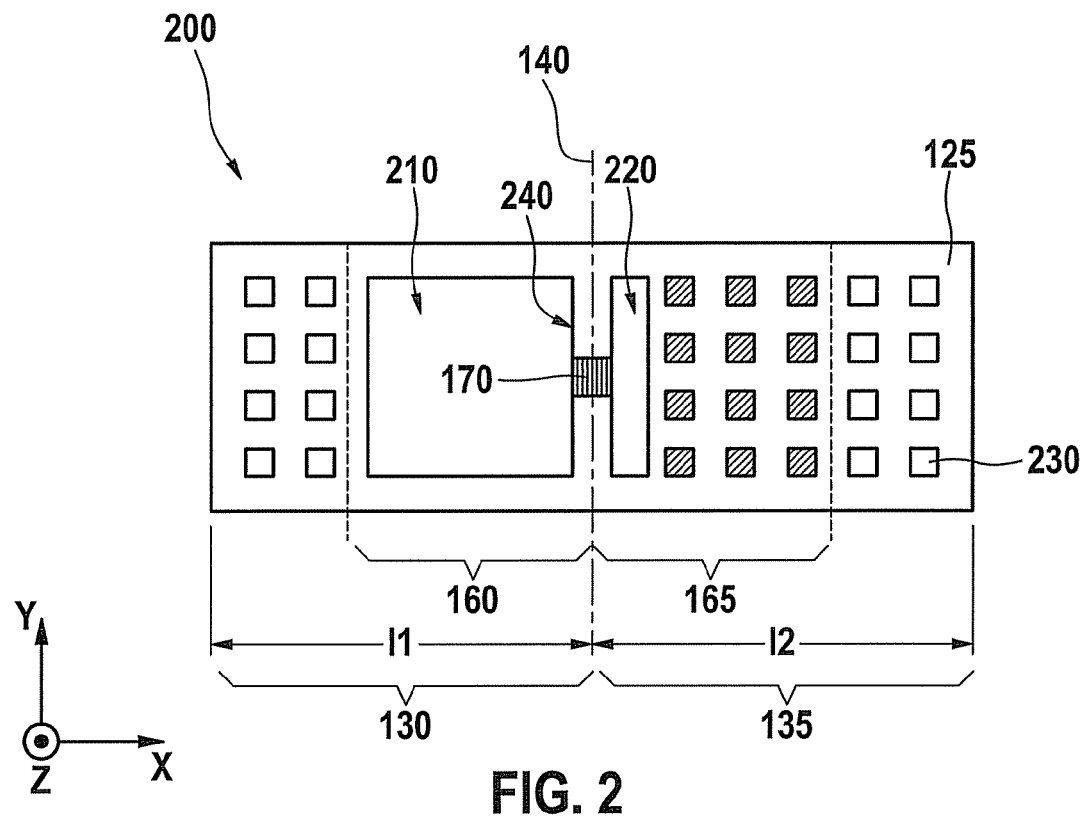
FIG. 2 shows a top view of the micromechanical system from FIG. 1.

FIG. 2 shows a top view 200 of mass structure 125 of micromechanical system 100 from FIG. 1. A coordinate system specifies the x, y and z directions. Lever arms 130 and 135 extend to the outside from axis of rotation 140 and have identical lengths l1 and l2. First lever arm 130 has a first recess 210 and second lever arm 135 has a second recess 220. Recesses 210 and 220 limit a torsion spring 240 which connects mass structure 125 to fastening structure 170 and acts counter to a tilting of mass structure 125 from its resting position parallel to substrate 105. Furthermore, mass structure 125 is breached by perforated recesses 230 at regular intervals.

A first possibility, shown in FIG. 2, for designing the mass of section 165 to be greater than that of section 160, is to dimension the surface of recess 210 to be larger than recess 220. Recesses 210 and 220 may be of different sizes in the x direction and of equal sizes in the y direction, as is shown in FIG. 2. A second possibility, also shown in FIG. 2, is to fill up existing perforation recesses 230 in second section 165 or not provide them at all and leave them in place in first section 160. Both possibilities result in a mass structure 125 having lever arms 130 and 135 of equal length, their center of gravity (not shown) lying outside of axis of rotation 140 on second lever arm 135.

Figure 3:
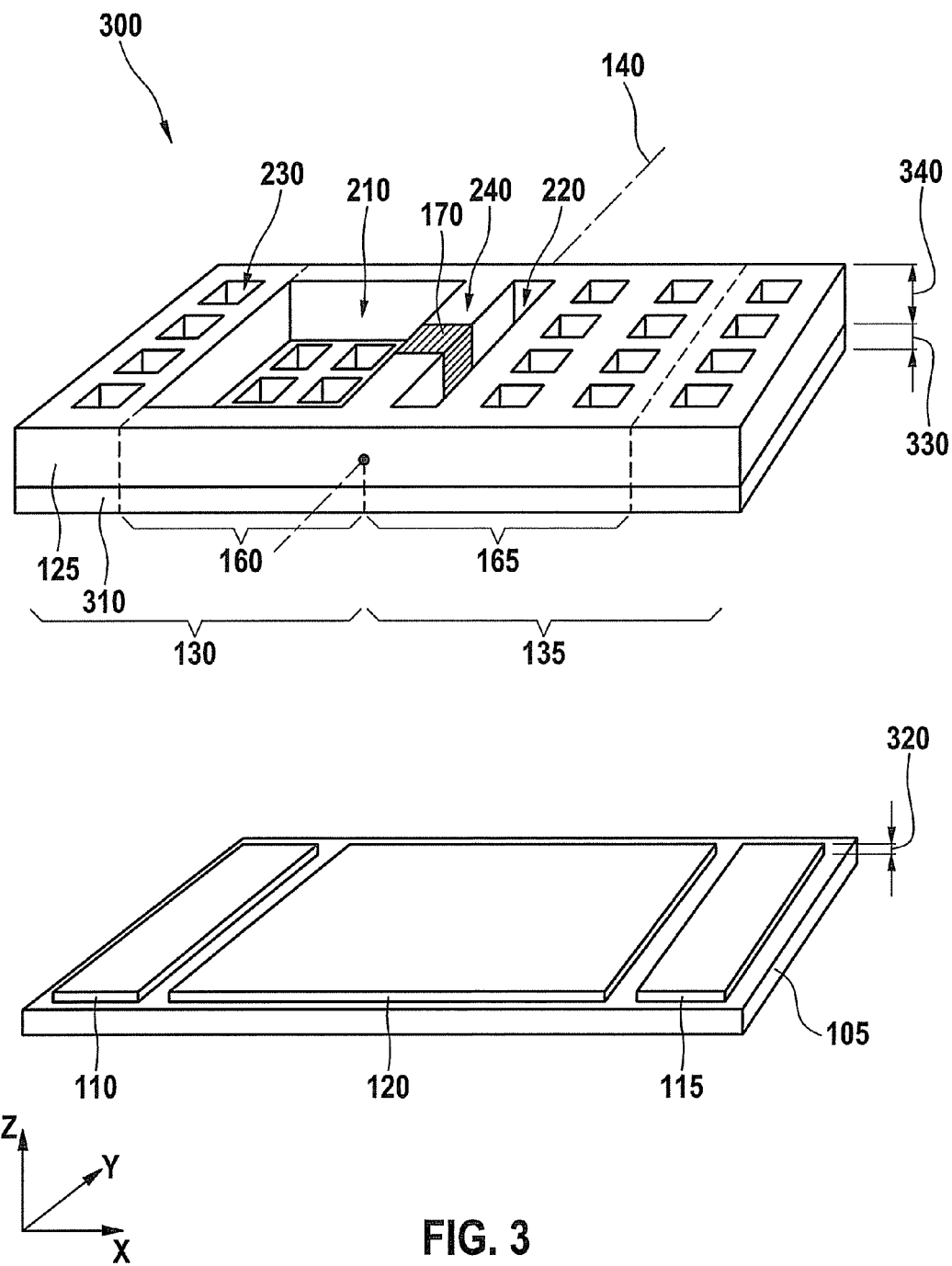
FIG. 3 shows an isometric exploded view of an exemplary embodiment of the micromechanical system from FIG. 1.

FIG. 3 shows an isometric exploded view 300 of a specific embodiment of micromechanical system 100 from FIG. 1. A three-dimensional coordinate system specifies the x, y and z directions. An anchoring of fastening structure 170 in third electrode 120 or in substrate 105 is not shown.

Mass structure 125 is generally embodied as shown in FIG. 2; however, perforation recesses 230 in second section 165 are not filled up as in FIG. 2. Moreover, the entire underside of mass structure 125 carries a cover layer 310 having a perforation corresponding to perforation recesses 230 of mass structure 125 and covers recesses 210, 220. To both sides of axis of rotation 140, cover layer 310 has surfaces of equal size which are diametrically opposed to third electrode 120 on substrate 105. Electrostatic attraction forces, which may also form between cover layer 310 and third electrode 120 due to parasitic (trapped) surface charges if third electrode 120 and cover layer 310 are connected to one another in an electrically conductive manner, have the same amount and the same direction on both sides of tilt axis 140, so that the electrostatic attraction forces are mutually compensated.

The micromechanical system may also be implemented in the form of a plurality of layers deposited on substrate 105. Three electrodes 110, 115 and 120 are part of a first functional layer 320 which is connected to substrate 105. Cover layer 310 forms a second functional layer 330, which is connected at its top to a third functional layer 340 which includes mass structure 125. During a production process, three layers 320, 330 and 340 together with one another and first functional layer 320 may be fastened to substrate 105 directly or using individual sacrificial layers (not shown), which are partially or completely removed during the course of a production process. Such a sacrificial layer is in particular required between first functional layer 320 and second functional layer 330 to make it possible for mass structure 125 to be movable in the finished micromechanical system after the sacrificial layers are removed.

In another specific embodiment, recess 210 may also be designed in the form of a deepening in mass structure 125 which does not break through layer 340. Cover layer 310 may then also be designed as a section of same functional layer 330, 340 as mass structure 125. Perforation recesses 230 are used for the support of a manufacturing process for micromechanical system 100 by making it possible for an etching medium to flow in order to remove sections of sacrificial layers or functional layers 320 to 340. Perforation recesses 230 are not essential for the present invention.

What is claimed is:
1. A micromechanical system for detecting an acceleration, comprising:
 a substrate;

a rocker-like mass structure having a first lever arm and a diametrically opposed second lever arm, which are situated tiltably at a distance in relation to the substrate and about an axis of rotation to the substrate; and first and second electrodes situated on the substrate, each electrode being diametrically opposed to a lever arm, wherein the two electrodes are arranged in mirror symmetry with respect to the axis of rotation, wherein each lever arm includes a section extending from the axis of rotation, the two sections having varying masses that lie above an intermediate space between the electrodes and each section includes an end section having equal masses, such that the first electrode is located under the end section of the first lever arm and the second electrode is located under the end section of the second lever arm, each at a distance farther from the axis of rotation than the two sections having varying masses.

2. The system according to claim 1, wherein one of the sections has a greater recess than the other section.

3. The system according to claim 1, wherein one of the sections includes an additional mass.

4. The system according to claim 1, wherein both lever arms are at an equal distance from the axis of rotation.

5. The system according to claim 1, further comprising an additional electrode situated on the substrate in the intermediate space between the electrodes.

6. The system according to claim 5, wherein an underside of the mass structure facing the substrate has a cover layer which is in mirror symmetry with respect to the axis of rotation.

7. The system according to claim 6, further comprising first, second and third functional layers, the electrodes being a component of the first functional layer, the cover layer being a component of the second functional layer, and the mass structure being a component of the third functional layer.

8. The system according to claim 1, wherein the mass structure is connected to the substrate via a fastening structure, the fastening structure including a torsion spring which acts counter to a tipping of the mass structure toward the substrate.

9. The system according to claim 8, wherein the fastening structure is connected to the substrate.

* * * * *